(No Model.) 6 Sheets—Sheet 1.
A. G. WISEMAN.
SELF WINDING AND SYNCHRONIZING CLOCK.
No. 502,156. Patented July 25, 1893.
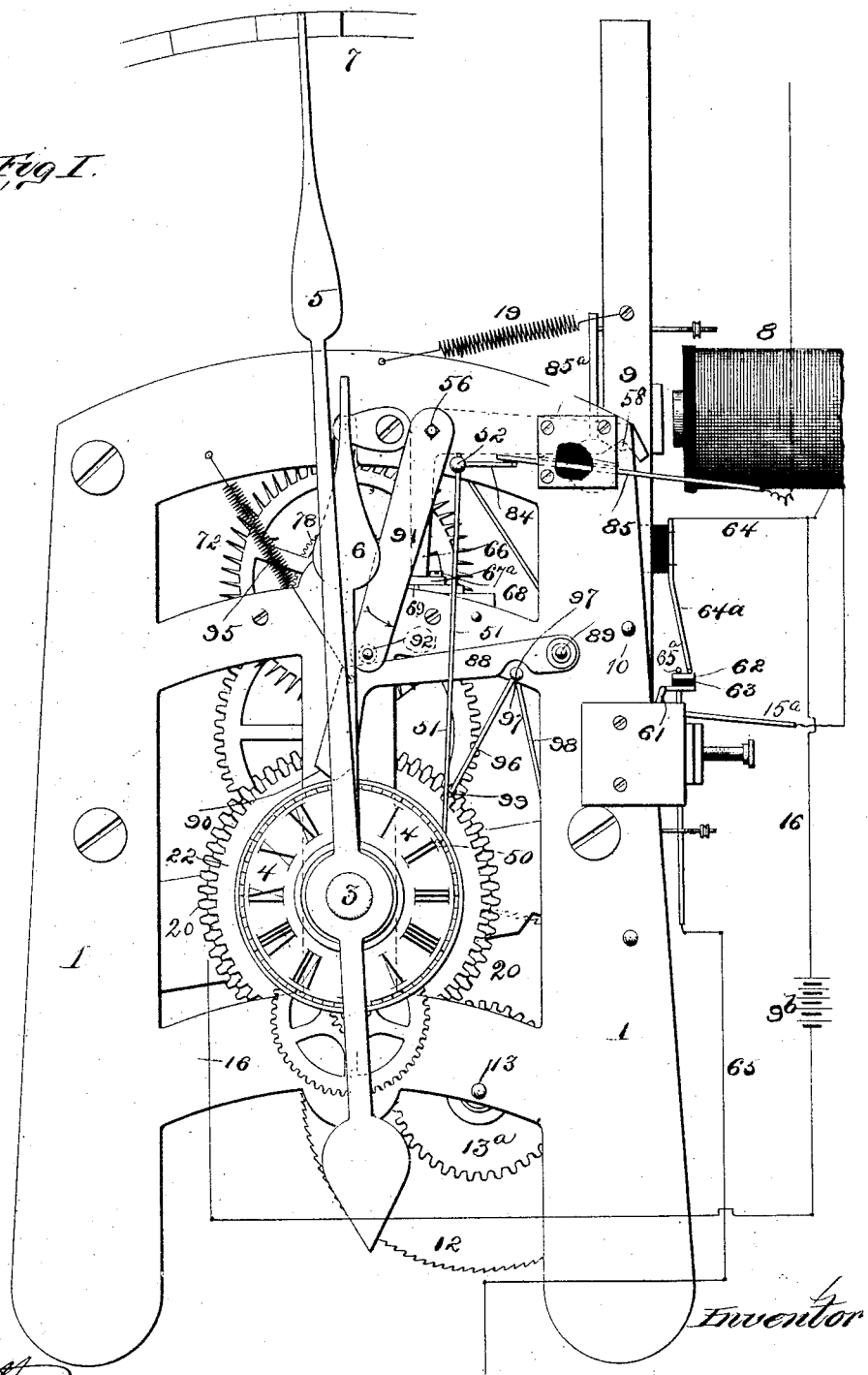

(No Model.) 6 Sheets—Sheet 2.
A. G. WISEMAN.
SELF WINDING AND SYNCHRONIZING CLOCK.
No. 502,156. Patented July 25, 1893.
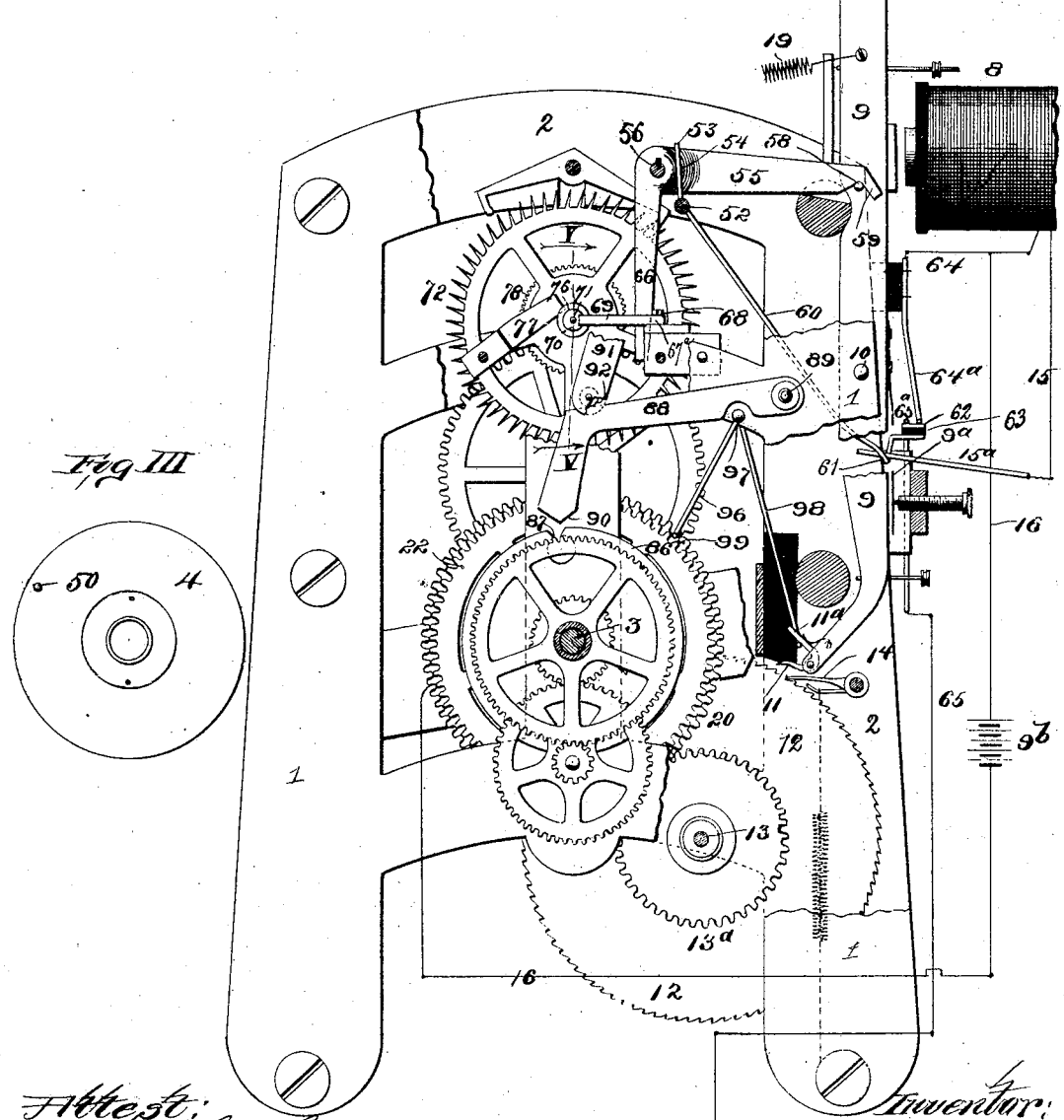

(No Model.) 6 Sheets—Sheet 3.
A. G. WISEMAN.
SELF WINDING AND SYNCHRONIZING CLOCK.
No. 502,156. Patented July 25, 1893.
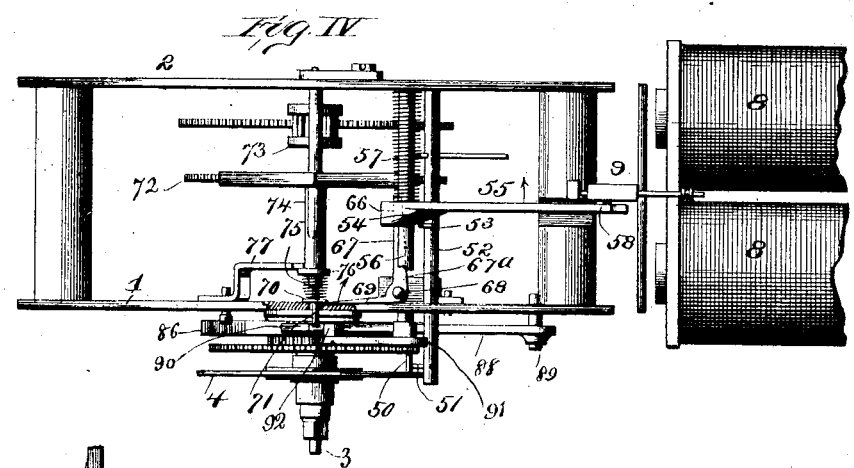
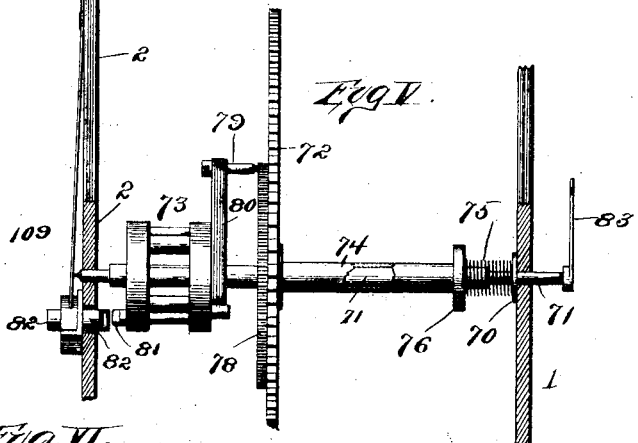
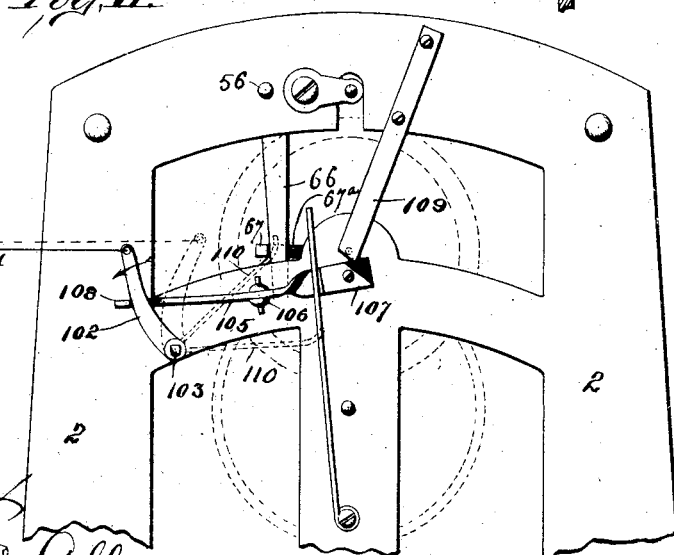
Attest:
Wm. J. H.
Walter E. Allen.
Inventor
Arthur G. Wiseman.
By Knight Bros. Attys.

(No Model.) 6 Sheets—Sheet 4.
A. G. WISEMAN.
SELF WINDING AND SYNCHRONIZING CLOCK.
No. 502,156. Patented July 25, 1893.
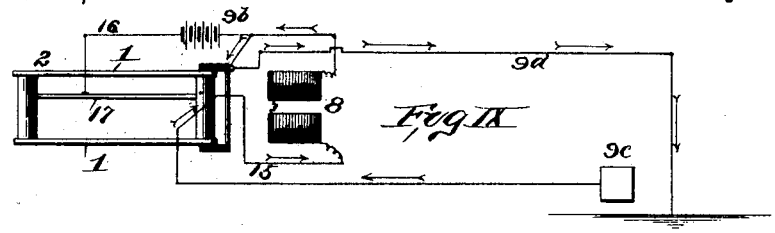
Fig. VII.
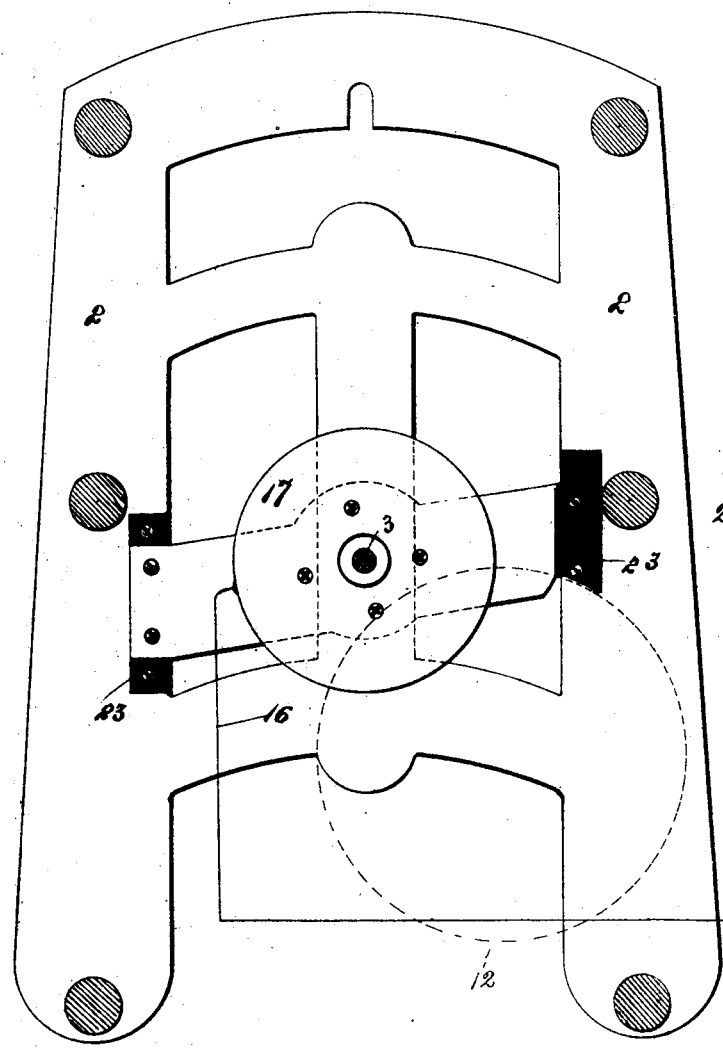
Fig. VIII.
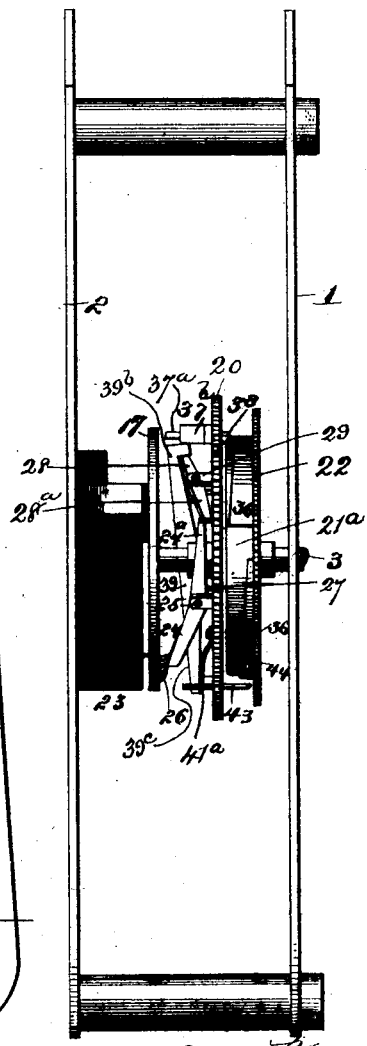
Attest
Walter E. Allen.
Inventor.
Arthur G. Wiseman.
By Wright Bros
Attys

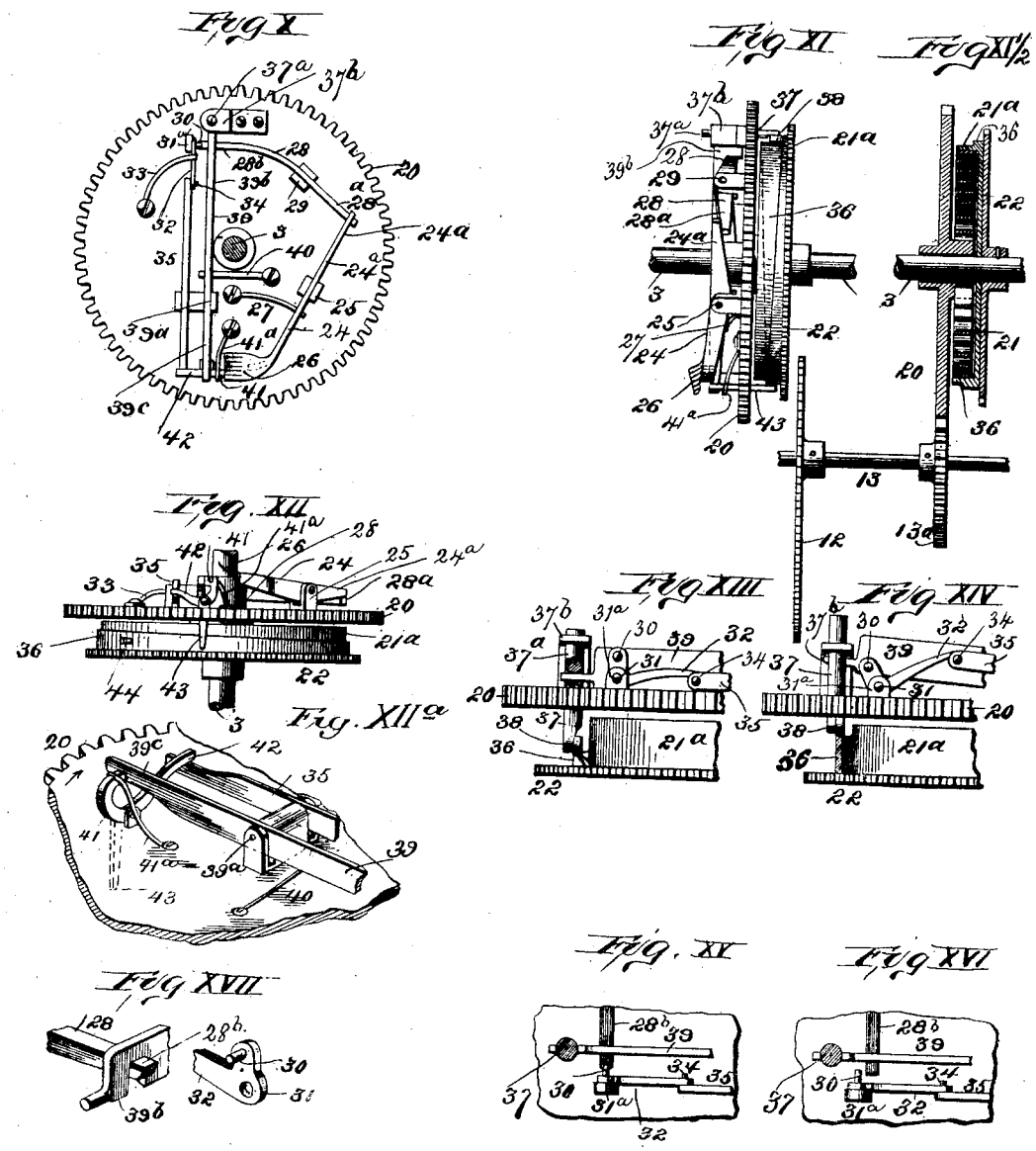

(No Model.)
A. G. WISEMAN.
SELF WINDING AND SYNCHRONIZING CLOCK.
No. 502,156. Patented July 25, 1893.
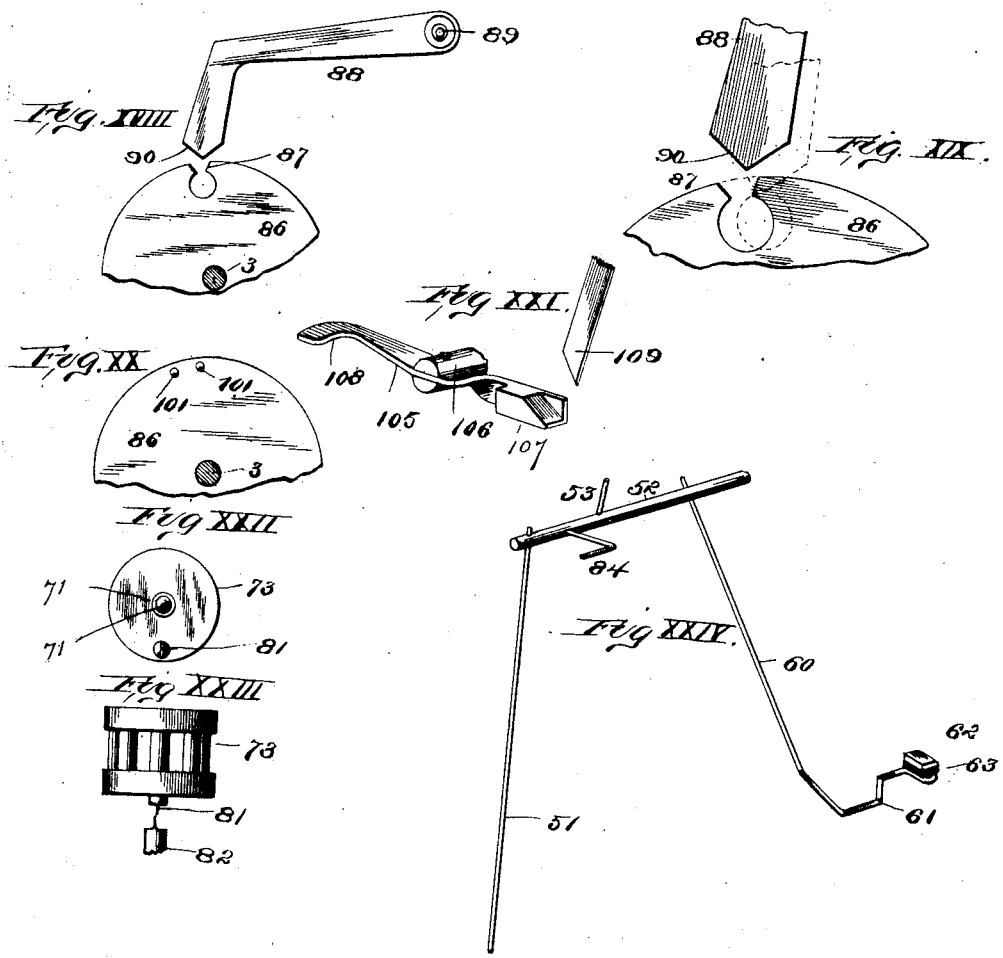
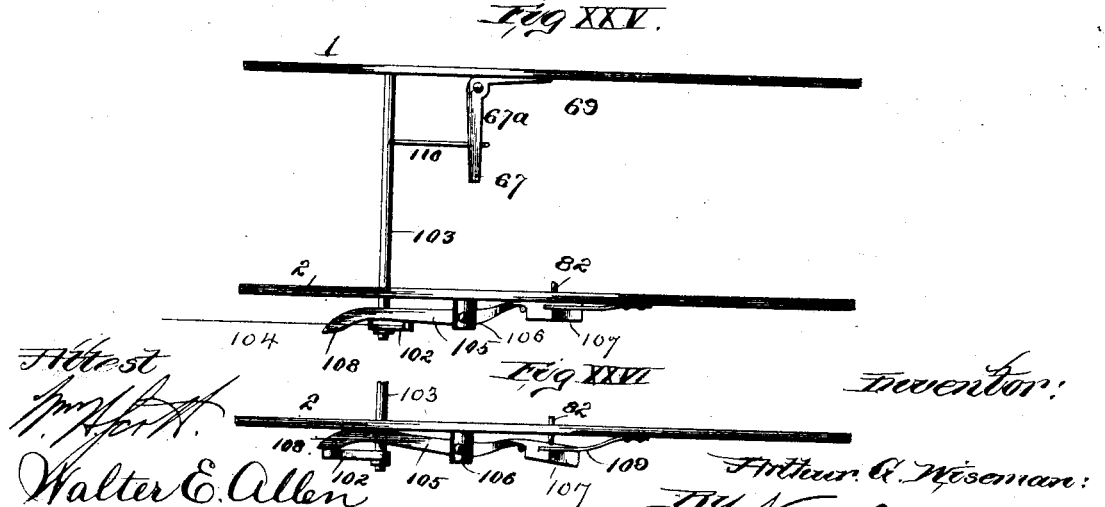
Attest
Walter E. Allen
Inventor:
Arthur G. Wiseman
By Knight Bros
Attys

UNITED STATES PATENT OFFICE.

ARTHUR G. WISEMAN, OF ST. LOUIS, MISSOURI.

SELF-WINDING AND SYNCHRONIZING CLOCK.

SPECIFICATION forming part of Letters Patent No. 502,156, dated July 25, 1893.

Application filed October 28, 1892. Serial No. 450,210. (No model.)

*To all whom it may concern:*

Be it known that I, ARTHUR G. WISEMAN, of the city of St. Louis, in the State of Missouri, have invented a certain new and useful Improvement in Self-Winding and Synchronizing Clocks, of which the following is a full, clear, and exact description, reference being had to the accompanying drawings, forming part of this specification.

My present invention relates to certain improvements in self-winding and synchronizing clocks, one magnet being used to accomplish both the winding and the synchronization of the clock.

My invention consists in features of novelty hereinafter fully described and pointed out in the claims.

Figure I is a front elevation, illustrative of my invention. Fig. II is a front elevation, part in section. Fig. III is a back view of the dial or disk used in connection with the synchronizing feature of my invention. Fig. IV is a top or plan view, part omitted. Fig. V is an enlarged, vertical section, taken on line V—V, Fig. II. Fig. VI is a detail, rear elevation. Fig. VII is an inside view of the back frame or plate of the clock. Fig. VIII is an edge view, showing part of the automatic winding mechanism. Fig. IX is a diagram. Fig. IX$^a$ is another diagram. Fig. X is a rear elevation of the circuit breaking wheel. Fig. XI is a side view of that shown in Fig. X. Fig. XI$\frac{1}{2}$ is an axial section of the drum portion. Fig. XII is a bottom view of that shown in Fig. X. Fig. XII$^a$ is a detail perspective view of that shown in Fig. X. Fig. XIII is a detail edge view showing parts in normal position. Fig. XIV is a detail edge view showing parts in operative position. Fig. XV is a top view of that shown in Fig. XIII. Fig. XVI is a top view of that shown in Fig. XIV. Fig. XVII is a perspective view of a connection between two levers. Figs. XVIII and XIX are detail views, illustrating the mechanism for rectifying the hour and minute hands of the clock. Fig. XX is a modification of the disk. Fig. XXI is a detail, perspective view of the lever for releasing the main spring. Fig. XXII is an end view of the escapement cage or drum. Fig. XXIII is a side view of the same. Fig XXIV is a perspective view of the connection between the dial and contact plate. Figs. XXV and XXVI are enlarged, detail views of the main spring releasing mechanism.

Referring to the drawings, 1 represents a suitable front plate, and 2 a suitable rear or back plate; these plates supporting the clock mechanism.

3 is the spindle of the hour and minute hands, upon which a dial or disk 4 is loosely mounted, but with which the dial has sufficient friction to be carried by the spindle in the working of the clock.

5 represents the minute and 6 the hour hand, mounted as usual on the spindle 3.

7 is the dial of the hour and minute hands.

I will first describe the self-winding feature of the clock.

8 represents a magnet.

9 represents an armature lever pivoted to the frame of the clock at 10. The lower end of the lever 9 carries a pawl 11, which is normally in engagement with the ratchet-wheel 12 on a shaft 13, which is connected by a pinion 13$^a$ to a circuit breaking wheel 20, (see Figs. I, II, VIII, X, XI and XI$\frac{1}{2}$, XII, XIII and XIV) to which the end of the main spring 21 see Fig. XI$\frac{1}{2}$ of the clock is secured, and thus it will be seen that as the lever 9 is vibrated, the clock will be wound through means of the magnet.

14 is a spring-actuated pawl see Fig. II for preventing retrograde movement of the ratchet-wheel 12. One terminal 15 of the magnet is connected to the clock-frame by an arm 15$^a$ and the other terminal 16 is connected to a contact disk or plate 17. See Figs. VII and VIII.

19 is a retracting spring, drawing the armature into its normal position when its circuit is broken.

The circuit-breaking wheel 20 is loosely mounted on the shaft 3.

The main spring 21 is inclosed by a barrel 21$^a$ secured to a pinion or gear-wheel 22, tightly mounted on the shaft 3. One end of the main spring, contained in the barrel 21$^a$, is secured to the wheel 20, as stated, and the other end is secured to the barrel 21$^a$, or, what would be the same thing, to the wheel 22. The wheel 22 is in connection with the escapement train of gearing. Now it will be understood that one end of the main spring being made fast to the barrel 21ª, which is, in turn made fast to the wheel 22, and the other end of the spring being made fast to the circuit-breaking wheel 20, the shaft 3 will be driven by the spring, and that as this shaft turns once in an hour the spring will be unwound one coil each hour, and to compensate for this unwinding, the circuit-breaking wheel must be turned forward just one revolution each hour. The means for giving this movement to the circuit-breaking wheel will now be described, reference being made to Figs. VII, VIII and X to XVII inclusive of the drawings. The fixed disk 17 of electro-conducting material is parallel with the circuit-breaking wheel and is transverse to the shaft 3, with which it is concentric. I prefer to make this disk of aluminium because of the non-oxidizing character of this metal. It is connected to the frame or plate 2 through means of insulating blocks or brackets 23.

24 is a contact lever, fulcrumed upon a post 25 projecting from the circuit-breaking wheel 20. The lever carries at one end a conducting brush 26 that is adapted to run against the face of the disk 17, and thus close the electric circuit.

27 is a spring acting on the inner side of the lever 24 and adapted to push the brush against the disk 17.

28 is a lever fulcrumed at 29. The shorter end 28ª of the lever 28 is below the end 24ª of the lever 24, so that when the end 28ª is thrown outward the conducting brush 26 is thrown out of contact with the disk 17; the lever 28 is held in the above described position by a spring catch 30, pivoted to a post 31ª on the wheel 20, at 31, and having an arm 32 receiving the pressure of a spring 33, to hold the arm down and the spring catch in engagement with the upper side of the end 28ᵇ of the lever 28. In order to release the catch, the arm 32 is raised by means of a pin 34 on a lever 35, and this pushes the catch 30 off the top of the end 28ᵇ of the lever 28, and allows it to fly out, when the contact-lever 24 swings on its fulcrum 25 and the brush 26 comes in contact with the disk 17. Normally, while the clock is running the circuit is broken, while at any point determined on, the electric circuit is closed by contact of brush 26 with the disk 17 while the circuit breaking wheel is making one revolution. It will be seen that the running of the clock is not affected because the power of the main spring is maintained upon the shaft 3.

36 is an incline upon the inner side or face of the wheel 22, and concentric with the shaft 3.

37 is a rod parallel with the shaft 3, and working in bearings 37ᵇ in the wheel 20; this rod carries an anti-friction roller 38, bearing upon the incline, so that as the wheel 22 rotates, the wheel 20 being at rest, the rod 37 is gradually forced outwardly. The rod is connected by one end 37ª to a lever 39, fulcrumed to the wheel 20 at 39ª.

40 is a spring drawing the end 39ᵇ of the lever 39 outwardly. 41 is a catch engaging the end 39ᶜ of the lever 39, when the other end has been carried to its outer position. The catch 41 is actuated by a spring 41ª to throw it into active position. The spring-catch has a finger 42 extending over the end of the lever 35 and by its pressure on the end of the lever serving to force out the other end of the lever, and release the catch 30, as before explained. The catch 41 has an arm 43 that extends through the circuit breaking wheel 20 nearly to the wheel 22, and upon the wheel is a pin or stud 44 that engages with the arm 43 and moves the catch first forward and then backward during the process of winding.

The operation will now be described. The contact brush 26 is out of contact with the disk 17, and the circuit breaking wheel 20 is at rest, and the shaft 3 turning at the speed of one revolution in an hour. At this time the rear end of the contact lever 24 is held out by the end 28ª of the lever 28 beneath it, and the other end of the lever 28 is held by the spring catch 30, and these parts retain their position until the electric contact is to be made. As the shaft 3 rotates the incline 36 comes to the anti-friction wheel 38 and the end of the lever 39 is gradually thrown outwardly from the position seen in Fig. XIII to the position seen in Fig. XIV. The other end 39ᶜ of the lever 39 is now in position to allow the catch 41 to engage over it and this it does under the influence of the spring 41ª. Just at this time the stud 44 of the wheel 22 strikes the projection 43 of the catch and by forcing in that end of the lever 35 throws out the other end and disengages the catch 30 from the end of the lever 28, allowing such end to fly out and allowing the contact lever 24 to move the other end 28ª of the lever inwardly, and to carry the brush 26 into contact with the disk 17. The circuit breaking wheel now rotates under the influence of the electro-magnet and described connections, the revolution occupying, say, one second. As the revolution is completed, the projection 43 overtakes the stud 44 and impinging against it is held backward so as to pull the catch 41 off the end of the lever 39, when the other end 39ᵇ of the lever descends, carrying down the end of the lever 28, and throwing out the other end 28ª beneath the inner end of the contact lever and retracting the brush 26, thus breaking the contact. It will be observed that the electric circuit is broken by the inward movement of the end 39ᵇ of the lever 39, the said lever acting on the levers 28 and 24 in the manner described. It will also be seen that the end 39ᵇ of the lever 39 is gradually moved outwardly by the incline 36, while the electric circuit remains broken. The catch 30 allows the above action by holding down that end of the lever 28 until the revolution of the wheel 22 is completed, and until the projection 43 is engaged by the stud 44 and the catch is disengaged from the lever 28.

The electric circuit may be arranged in any manner that will produce the desired effect.

The diagram, Fig. IX, in connection with the other figures, will serve to show an effective arrangement. The terminal 15 extends to the clock case and excites the circuit breaking wheel 20 with the contact lever 24 and brush 26. The other terminal wire extends from the magnet to the insulated plate or disk 17, then from the insulated spring $9^a$ on the armature lever to the electric cell $9^b$, and from the cell to the contact disk 17.

$9^c$ represents the station from which the clock is synchronized, and $9^d$ the ground wire. This winding mechanism I have described is, in the main, the same as that shown and described in my application filed July 30, 1892, Serial No. 441,720. My present arrangement differs, however, from that of said application in that the spring barrel 21 is secured to the wheel 22 instead of to the wheel 20, the wheel 22 being fixed to the shaft 3 while the wheel 20 is loose on the shaft. In my present application, I have shown a brush 26 on the lever 24, in lieu of the roller of my former application.

I will now describe the synchronizing feature of my clock, which I accomplish through means of the same magnet and armature which is utilized for winding the clock, thus availing myself of but a single magnet and armature for both winding and synchronizing. The dial 4, as already stated, is mounted on a shaft 3, with sufficient frictional contact to turn with the shaft in the ordinary working of the clock, while by applying sufficient pressure to overcome the friction, it can be turned on the shaft. This dial is provided with a pin 50, (see Figs. I, III and IV,) which pin comes against the lower end of a lever 51 depending from a shaft or rod 52 journaled in the frame of the clock. (See Fig. IV.) On the shaft 52 is a pin or projection 53, which, as the shaft is turned by the pin 50 coming against the lever 51, bears against an incline or cam face 54, on an arm 55, which is mounted on a rod 56, supported by the clock frame. As the pin 53 bears against the incline 54, it forces the arm 55 laterally in the direction of the arrow, (Fig. IV,) against the pressure of a spring 57 which surrounds the rod 56 and restores the arm 55 to its original or normal position, when the pin 53 turns back to its normal position. As the arm 55 is thus forced laterally, its outer end is brought in position to be acted upon by a pin 58 on the armature lever 9, (see Figs. II and IV) the arm having an incline 59 against which the pin 58 bears and works when the arm has been thus forced over and the armature lever is moved as hereinafter explained. Upon the rod or shaft 52 is also a depending arm 60, a perspective view of which is shown in Fig. XXIV; the lower end of this arm 60 is bent as shown at 61, and carries a contact plate 62 insulated from it as shown at 63. As the rod or shaft 52 is turned, as described, its end 61 comes in contact with the end $15^a$ of the wire 15, which, as stated, bears against the clock frame, when in its normal position, and raises this wire out of contact with the clock frame, as shown in Fig. II, and at the same time the contact plate 62 closes the circuit between the end $64^a$ of a wire 64 from the magnet and the end $65^a$ of a ground wire 65. It is proper to state in this connection, that when the arm 60 is raised to close the circuit between the wires 64 and 65, by bringing the plate 62 in contact with both of the ends $64^a$ and $65^a$ of these wires, the wire 16 is inoperative, for the reason that at this time the brush 26 of the winding mechanism is not bearing against the disk or plate 17. The arm 55 has a depending arm 66, which, when the arm 55 is raised by the armature lever 9, being attracted by the magnet 8, as explained, comes against the inner end 67 of a bell crank lever $67^a$, pivoted at 68, (see Fig. IV) and by moving the end 67 of the lever moves the end 69 of the lever in the direction of the arrow, Fig. IV. The point of the end 69 of the lever fits behind a disk or plate 70 on the second hand shaft 71, which shaft also carries the escapement wheel 72 and cage 73; the escapement wheel not being mounted directly on the shaft, but on a sleeve 74, through which the shaft passes. The shaft is held in its normal position by a spring 75, (see Fig. V) which fits between the disk 70 and a disk 76 on the sleeve 74, the sleeve being held from deflection by the spring 75 through means of a bracket 77, (see Fig. IV.)

On the escapement wheel 72 is a toothed wheel 78, which is engaged by a pin 79, on an arm 80, secured to the cage 73. When the lever $67^a$ is moved, as described, the second hand shaft 71 is shifted endwise against the pressure of the spring 75. As it is thus shifted the pin 79 is carried out of engagement with the teeth of the wheel 78, and thus the shaft 71 is disconnected from the escapement wheel, and under the influence of the main spring of the clock (with which the second hand shaft is connected by gearing as usual) is turned until a pin 81 on the cage comes against a stop 82 projecting inwardly from the back plate or frame of the clock, which contact takes place when the second hand points at 12 on the dial, if that is the hour the clock is synchronized, or if the clock is synchronized at some other hour, then the contact takes place when the second hand points at that hour, the time of synchronization being predetermined by turning the dial 4 to any desired position on the minute hand shaft so that the pin 50 will engage the arm 51 sooner or later. It will thus be seen that when the hour or time of synchronization arrives, and the current is passed through the magnet to attract the armature lever, the mechanism which moves the second hand will be thrown out of gear, so that the main spring will act upon the second hand 83 to rectify it if out of time. There is but one impulse, or but one movement of the armature lever that takes place in synchronizing, and as soon as the pin 50 leaves the lever 51, the parts all resume their normal position so that the usual operation of the clock is not interfered with, and when in their normal position they are not operated upon by the action of the armature, or armature lever, in winding the clock, as the arm 55 is out of the path of the point 59. The rod or shaft 52 has an arm 84, which, as the rod or shaft is turned by the pin 50, engaging the lever 51, comes against a wire 85 from the magnet, to complete the circuit; this wire 85 being held by a non-conducting block or holder 85$^a$, see Fig. I. A diagram of this circuit is shown in Fig. IX$^a$. It will thus be understood how the second hand is synchronized, and to synchronize the minute hand at the same time that the second hand is synchronized, I secure a disk 86 to the minute hand sleeve, which disk has a V notch 87, (see Figs. II, XVIII and XIX.)

88 is an arm pivoted at 89 to the clock frame and provided with a conical or V-shaped end 90.

On the shaft 56 is a lever 91, (see Fig. I,) which has a friction roller 92 in its lower end that bears against the arm 88. As the armature lever is attracted by the magnet when the second hand is synchronized, it, through means of the arm 55 and rod 56, moves the lever 91 in the direction of the arrow, Fig. I, and forces the V-shaped end 90 of the arm 88 into the V-shaped notch 87 of the disk 86, and as the V-shaped end of the arm seats itself in the V-shaped notch, it will move the disk either way, and thus rectify the minute hand, as will be readily understood. The lever 88 and arm 55 are of course both arranged to turn with the rod 56, while the arm 55 is free to move endwise on the rod, or the rod may be arranged to move endwise slightly to provide for the lateral movement of the arm 55, which movement of course is very slight, and in this case the arm 55 would be rigidly secured to the rod. When the lever 91 returns to its normal position, the arm 88 is raised out of contact with the disk 86 by means of a suitable spring 95.

It is desirable during the time of synchronization to have the parts so arranged that the movement of the armature will not act upon the winding mechanism of the clock, so that the synchronizing current will not have to move the winding mechanism, as well as the synchronizing mechanism. To accomplish this, I secure an arm 96, to a rod 97, supported in the clock frame, see Figs. I and II, to which rod is also secured an arm 98, that has its lower end bent to engage the heel 11$^a$ of the pawl or dog 11, which is pivoted to the lower end of the armature lever, and which engages the ratchet-wheel 12, as stated. The lower end of the arm 96 has an outturned end 99, which is in the path of the lever 51, so that just before the pin 50 leaves the end of the lever 51, the lever comes against the arm 96, and by turning the rod 97 moves the arm 98, which lifts the pawl or dog 11 out of engagement with the ratchet-wheel 12, as shown in Fig. II, thus permitting the movement of the armature lever during the time of synchronization without imparting movement to the winding mechanism.

In Fig. XX I have shown a modification of the notch 87 in the disk 86, which consists of two pins 101 secured to the disk between which the conical or V-shaped end 90 of the arm 88 may be pressed, instead of being pressed into the V-shaped notch 87.

It is sometimes desirable to release the main-spring of a clock and allow it to run down, and this can very easily be applied to my present arrangement, by simply providing a means for moving the stop 82 out of the path of the pin 81, when the cage 73 is forced over, as explained, to carry the pin 79 out of engagement with the wheel 78. The mechanism which I have shown for thus moving the stop 82 (see Fig. VI), consists of an arm 102, pivoted at 103 to the clock frame, and provided with a pull string or wire 104. 105 is a lever pivoted to the clock frame at 106, and to the inner end 107 of which the stop pin 82 is secured. The outer end 108 of the lever 105 is inclined, as shown in Fig. XXI, and it is against this end 108 of the lever that the arm 102 is drawn by the pull wire or string 104, and as the arm is thus drawn against the outer end of the lever, the inner end 107 of the lever, with the stop 82, is moved outwardly, carrying the stop out of the path of the pin 81, as explained. 109 is a spring for holding the inner end of the lever and its stop 82 in their inner or normal position. To move the pin 79 out of engagement with the wheel 78, when the arm 102 is drawn back, I extend the pivot rod 103 of said arm across the clock and secure to said rod an arm 110, (see Fig. XXV, and dotted lines Fig. VI,) which engages the end 67 of the lever 67$^a$, so that this lever will thus move the second hand shaft when the arm 102 is pulled to turn the rod 103, and thus by a simple pull on the wire or string 104, the escapement of the clock is cut out and the stop, which would otherwise prevent the retrograde movement of the cage 73 more than one revolution, is withdrawn.

I claim as my invention—

1. In a self-winding and synchronizing clock, the combination of a single magnet, an armature lever, mechanism operated by said magnet and lever to wind the clock, and mechanism operated by said magnet and lever to synchronize the clock, whereby but one magnet and armature is required to both wind and synchronize; substantially as set forth.

2. In a self-winding and synchronizing clock, the combination of a single magnet, an armature-lever, mechanism operated by said magnet and lever, to wind the clock, mechanism operated by said magnet and lever to synchronize the clock whereby but one magnet and armature is required to both wind and synchronize and mechanism for breaking the winding circuit at the time of synchronizing; substantially as described.

3. In a self-winding and synchronizing clock, the combination of a single magnet, an armature lever, mechanism operated by said magnet and armature lever to wind the clock, mechanism operated by said magnet and armature lever to synchronize the clock, and mechanism for disengaging said lever from the clock mechanism when the clock is to be synchronized; substantially as set forth.

4. In a self-winding and synchronizing clock, the combination of a single magnet, an armature lever, mechanism operated by said magnet and armature lever to wind the clock, mechanism operated by said magnet and armature lever to synchronize the clock, mechanism for disengaging said lever from the clock mechanism when the clock is to be synchronized, and mechanism for breaking the winding circuit at the time of synchronizing; substantially as described.

5. In a self-winding and synchronizing clock, the combination of a single magnet and armature lever, mechanism operated by said magnet and lever to wind the clock, mechanism operated by said magnet and lever to synchronize the clock whereby but one magnet and armature is required to both wind and synchronize, and mechanism for breaking the winding circuit at the time of synchronizing consisting of the disk 4 having a pin 50, the shaft 52 having lever 51, engaged by the pin, and an arm 60 for disengaging the wire 15; substantially as described.

6. In a self-winding and synchronizing clock, the combination of a magnet, an armature lever, a disk or dial adapted to move with the minute hand of the clock, a pin or projection on said disk, mechanism operated by said disk to close the circuit, and mechanism operated by said disk to disconnect said armature lever from the winding mechanism of the clock, when the clock is to be synchronized, consisting essentially of arms 96 and 97, and a lever 51, substantially as set forth.

7. In a synchronizing clock, the combination of a magnet, an armature lever, a disk or dial adapted to move with the minute hand of the clock, a pin or projection on said disk, and mechanism operated by said disk to close the circuit comprising the shaft 52 having the lever 51, and pin 53, the arm 55 having a cam face 54, a rod on which the arm is moved by the pin bearing on the cam face, and a spring for returning the arm, and a pin on the armature lever receiving the impact of the arm; substantially as set forth.

8. In a synchronizing clock, the combination of a magnet, an armature, a disk or dial adapted to move with the minute hand of the clock, mechanism moved by said disk to close the circuit, an arm moved by said disk into position to be engaged by the armature lever, and mechanism moved by said arm, when the armature is attracted to the magnet, to disconnect the second hand shaft from the escapement of the clock, substantially as and for the purpose set forth.

9. In a synchronizing clock, the combination of a magnet, an armature lever, a disk or dial adapted to move with the minute hand of the clock, a pin carried by said disk, a lever adapted to be engaged by said pin, an arm 55 having an inclined face, a pin or projection moved by said lever and bearing against said inclined face on the arm to move the arm laterally, a projection on said armature lever adapted to engage the end of said arm when the armature is attracted by the magnet, an arm 66 operated by said arm 55 to move the second hand shaft longitudinally, a projection carried by the cage on said second hand shaft, and which is adapted to engage a toothed disk on the escapement wheel, a pin 81 on said cage and a stop 82, substantially as and for the purpose set forth.

10. In a synchronizing clock, the combination of a magnet, an armature lever, an arm 55 adapted to be moved by the minute hand shaft, bell crank lever 67ª, a second hand shaft 71, a cage on said second hand shaft, a projection 79 carried by said cage, and adapted to engage a toothed wheel or disk secured to the escapement wheel, a pin 81 on said cage and a stop 82, substantially as and for the purpose set forth.

11. In a synchronizing clock, the combination of the magnet, an armature lever, an arm 55 having an inclined end 59 adapted to be engaged by a pin on said armature lever and having an incline 54, a rod 52 having a pin 53 and a lever 51, a disk or dial 4 having a pin 50, a bell crank 67ª, an arm 66 depending from the arm 55 adapted to engage and move said bell crank lever, a second hand shaft 71, a disk on said second hand shaft behind which said bell crank lever fits, a cage on said second hand shaft having an arm 80 carrying a pin 79, a toothed disk or wheel 78 secured to the escapement wheel, a projection or pin 81 on said cage, and a stop 82, all substantially as and for the purpose set forth.

12. In a synchronizing clock, the combination of a magnet, an armature lever, mechanism moved by said armature lever to disconnect the second hand from the escapement wheel and mechanism moved by said armature lever to correct the minute hand of the clock; said mechanism consisting essentially of a notched disk, an arm having a conical end and a lever arranged to move said arm to press its conical head into said notch, substantially as and for the purpose set forth.

13. In a synchronizing clock, the combination of a magnet, an armature-lever, carrying a pin a notched disk connected to the minute hand of the clock, an arm having a conical end to engage in said notch, a lever adapted to bear against said arm, and which is moved by said armature; and a shaft carrying the last named lever; having an arm provided with an incline engaging the pin on the armature-lever substantially as and for the purpose set forth.

14. In a synchronizing clock, the combination of the rod 52, having a lever 51, a disk carried by the minute hand shaft, and adapted to move said lever, and an arm 60 on said shaft carrying an insulated contact plate 62 for closing the circuit, substantially as and for the purpose set forth.

15. In a synchronizing clock, the combination of an arm 102, lever 105 having an inclined end 108, a stop 107 secured to said lever, a cage carried by the second hand shaft and having a pin adapted to engage a toothed disk carried by the escapement wheel, a pin 81 on said cage, an arm 110, adapted to be moved by said arm 102, and a bell crank lever 67$^a$, adapted to move said second hand shaft, substantially as and for the purpose set forth.

ARTHUR G. WISEMAN.

In presence of—
ALBERT M. EBERSOLE,
ED S. KNIGHT.